United States Patent Office 3,651,096
Patented Mar. 21, 1972

3,651,096
PREPARATION OF DIETHYL TETRAHYDRO-FURFURYLMALONATE
Nicholas D. Harris, Norwich, N.Y., assignor to The Norwich Pharmacal Company
No Drawing. Filed Nov. 21, 1969, Ser. No. 878,897
Int. Cl. C07d 5/04
U.S. Cl. 260—347.5                    1 Claim

ABSTRACT OF THE DISCLOSURE

Diethyl tetrahydrofurfurylmalonate is conveniently prepared by the hydrogenation of diethyl furfurylidenemalonate in the presence of palladium on carbon.

---

This invention relates to the preparation of diethyl tetrahydrofurfurylmalonate, a compound useful as an intermediate in the synthesis of compounds having vasodilating capabilities as disclosed in U.S. Pats. Nos. 3,334,096 and 3,257,420. In particular this invention is concerned with the preparation of diethyl tetrahydrofurfurylmalonate via the catalytic hydrogenation of diethyl furfurylidenemalonate in the presence of palladium on carbon as the catalyst.

In the past, diethyl tetrahydrofurfurylmalonate has been prepared by reductive procedures demanding high temperature and pressure.

Catalytic hydrogenation of diethyl furfurylidenemalonate employing Raney nickel catalyst and high temperature and pressure has been successfully employed to prepare diethyl tetrahydrofurfurylmalonate (Comp. Rend. 208, 359 (1939); Ber. 76B, 676 (1943); J. Am. Chem. Soc. 56, 2424 (1934); and J. Am. Chem. Soc. 54, 4116 (1932) are illustrative). The high temperature and pressure required in the prior art method of preparation are not desirable because of the hazard of explosion associated therewith.

In accordance with the present invention it has been discovered that diethyl tetrahydrofurfurylmalonate can be readily and conveniently prepared in high yield by a process which involves hydrogenating diethyl furfurylidenemalonate in the presence of palladium on carbon as a catalyst at the relatively low temperature of from 65–70° C. and a pressure of from 1–3 atmospheres.

The carrying out of this process is relatively simple: diethyl furfurylidenemalonate is dissolved in an inert solvent, such as ethanol, containing the catalyst consisting of palladium deposited on carbon and hydrogen introduced over a time period of about two hours until uptake of hydrogen ceases. The catalyst is removed by filtration and the product recovered from the filtrate.

In order that this invention may be readily understood by and available to those skilled in the art the following exemplary description is supplied:

1170 g. of diethyl furfurylidenemalonate was dissolved in 1.5 liters of ethanol containing 50 g. of 5% palladium on carbon in a one gallon stirred autoclave. Hydrogen was introduced over a period of two hours while maintaining a temperature of 65–70° C. and a pressure of 1–3 atmospheres in the reaction vessel until hydrogen uptake ceases. The vessel was allowed to cool, vented, and the catalyst filtered from the reaction mixture. The solvent was removed from the filtrate and the residue fractionated yielding 1120 g. (93%) of diethyl tetrahydrofurfurylmalonate having a boiling point of 103–104° C. at 0.3 mm.

What is claimed is:
1. The method of preparing diethyl tetrahydrofurfurylmalonate which consists in hydrogenating diethyl furfurylidenemalonate in the presence of 5% palladium on carbon at a temperature of 65–70° C. and at a pressure of 1–3 atmospheres.

References Cited

Hinz et al. Chem. Abstracts (1944) vol. 38 2334–5.
Shurkin et al. Chem. Abstracts (1965), vol. 62, 9088a.
Herbert O. House, Modern Synthetic Reactions, New York, W. A. Benjamin (1965) pp. 1, 2, 3, 4, 5, 6, 7, 8, 9, 10.

ALEX MAZEL, Primary Examiner
B. DENTZ, Assistant Examiner